July 8, 1924.  
B. H. HOWARD ET AL  
HOT TOP FEEDER FOR INGOT MOLDS  
Filed April 24, 1924   2 Sheets-Sheet 1
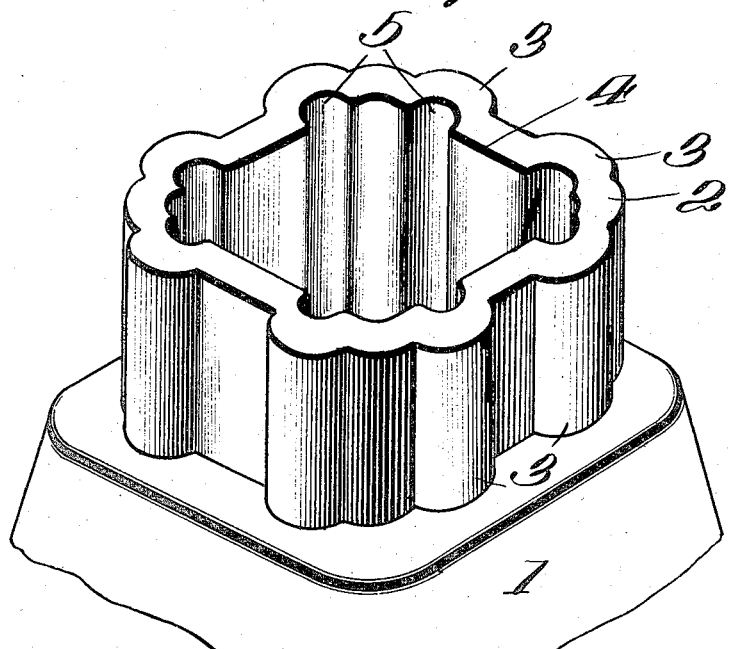
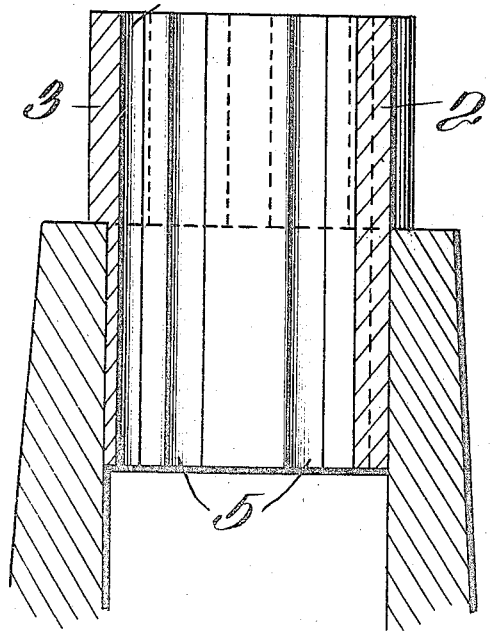
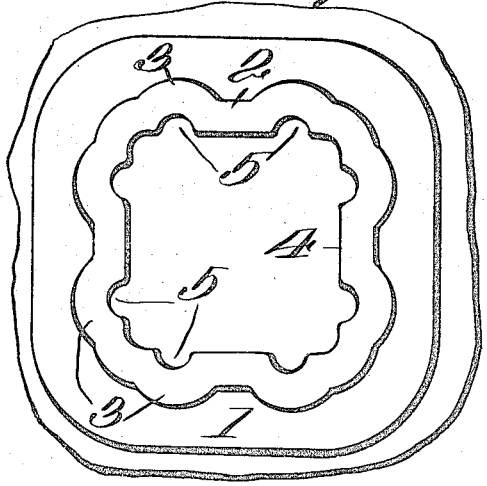
Inventors  
B. H. Howard  
E. J. Turner  
By C. R. Wright, Attorney July 8, 1924.

B. H. HOWARD ET AL

HOT TOP FEEDER FOR INGOT MOLDS

Filed April 24, 1924    2 Sheets-Sheet 2

1,500,762

Inventors
B. H. Howard
E. J. Turner
By C. R. Wright
Attorney

Patented July 8, 1924.

1,500,762

UNITED STATES PATENT OFFICE.

BLOOMFIELD H. HOWARD, OF WASHINGTON, DISTRICT OF COLUMBIA, AND ERNEST J. TURNER, OF PITTSBURGH, PENNSYLVANIA.

HOT TOP FEEDER FOR INGOT MOLDS.

Application filed April 24, 1924. Serial No. 708,684.

*To all whom it may concern:*

Be it known that BLOOMFIELD H. HOWARD and ERNEST J. TURNER, citizens of the United States, residing, respectively, at Washington, District of Columbia, and Pittsburgh, in the county of Allegheny and State of Pennsylvania, have invented certain new and useful Improvements in Hot Top Feeders for Ingot Molds, of which the following is a specification.

Our invention relates to improvements in hot top feeders for ingot molds.

The object of our invention is to provide a feeder made of refractory material of this character having ribs on its outer surface adapted to support the feeder on the upper end of the mold and which is provided with longitudinal grooves on its inner periphery to allow the escape of gases from the ingot mold and at the same time produce a feeder which will prevent "piping" and reduce "segregation."

Another object of our invention is to provide a feeder of this character in which the longitudinal grooves for the escape of gases are arranged opposite the supporting ribs whereby the walls of the feeder are of the same thickness throughout, and said grooves in no way weaken the feeder.

A further object of our invention is to provide a simple, cheap and effective feeder having certain details of structure and arrangement of parts hereinafter more fully set forth.

In the accompanying drawings:—

Figure 1 is a perspective view of a mold showing our improved feeder supported thereon.

Figure 2 is a vertical transverse sectional view of Figure 1.

Figure 3 is a top plan view of Figure 1.

Figure 4:
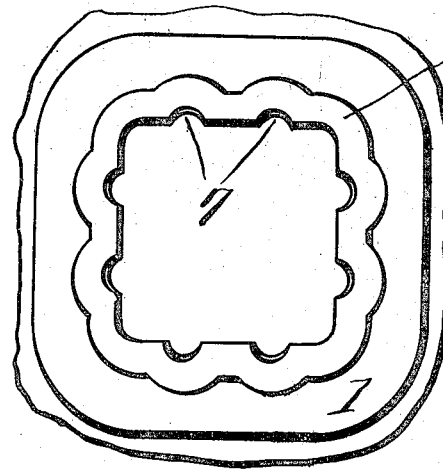
Figure 4 is a top plan view of a modified form of feeder showing tapering grooves for allowing the escape of the gases from the feeder.

Referring now to the drawings 1 represents the mold and 2 the feeder. The feeder 2 may be of any desired shape. The outer face of the feeder 2 is provided with any desired number of vertically disposed ribs 3 formed integral therewith and which terminate a distance from the lower end of the feeder and which serve as means for supporting the feeder within the upper end of the mold all of which is readily understood by those skilled in the art. The inner walls 4 of the feeder are provided with vertically disposed grooves 5 which as shown are opposite the ribs 3 and whereby the portion of the wall above the mold is the same thickness throughout. These vertically disposed grooves 5 as shown extend the entire length of the inner wall of the feeder and provide passages for the escape of gases from the ingot.

The vertically disposed grooves 5 as shown are comparatively narrow and provide passages for the escape of gases from the mold.

From Figure 2 of the drawings it will be seen that, that portion of the feeder above the mold has its walls of uniform thickness, the vertically disposed grooves 5 being channeled out of the supporting ribs 3. This is true in respect to that portion of the feeder above the mold, while that portion of the feeder below the mold, opposite the grooves is thinner, but this in no way weakens the feeder as this wall is wholly within the bore of the mold and is held against lateral movement by the wall of the mold.

In Figure 4 we have shown the feeder 6 provided with a number of vertically disposed grooves 7 which gradually taper towards the lower end so that the lower end of the vertically disposed grooves are shallower than the upper end. This arrangement of the grooves allows the thicker wall 8 at the lower end.

Figure 6:
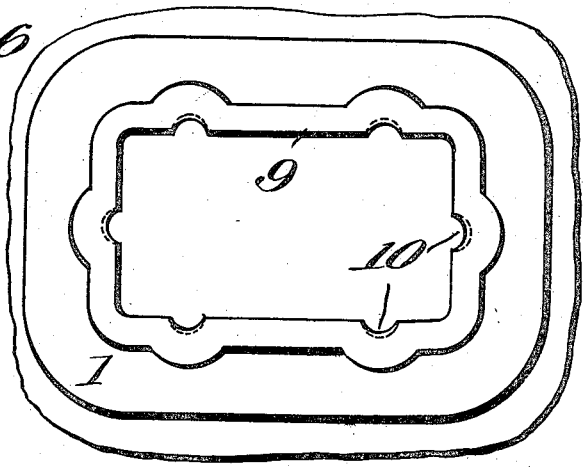
Figure 6 is a top plan view of a still further modified form of feeder.
Figure 5:
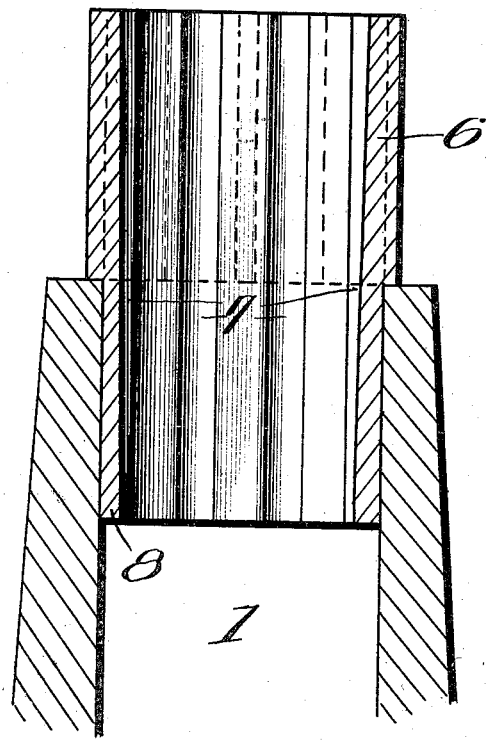
Figure 5 is a vertical transverse sectional view of Figure 4.
Figure 7:
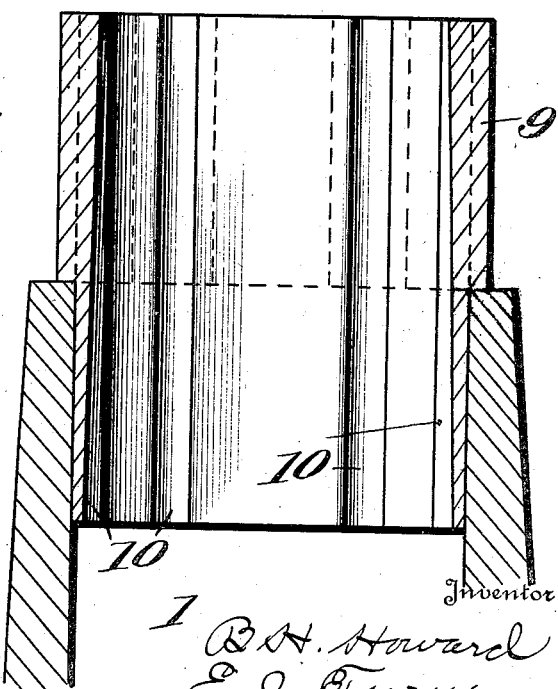
Figure 7 is a vertical transverse sectional view of Figure 6 showing grooves tapering in the opposite direction.

In the form shown in Figure 6 the feeder 9 is provided with the vertically disposed grooves 10 which taper from the lower end to the upper end that is, the lower end of the groove is deeper than the upper end so that a greater thickness of material is obtained for that portion of the feeder above the mold.

While we have shown and described these specific ways of carrying out our invention it will be understood that the same could be varied without departing from our invention.

Having thus fully described our invention what we claim is:

1. A hot top feeder for ingot molds comprising a body portion of refractory material having a series of vertically disposed grooves in its inner face.

2. A hot top feeder for ingot molds comprising a body portion having a series of vertically disposed tapering grooves.

3. A hot top feeder for ingot molds comprising a body portion of refractory material having integral ribs carried by its outer periphery for supporting it on the mold and vertically disposed grooves opposite said ribs.

4. A hot top feeder for ingot molds comprising a body portion of refractory material having vertically disposed grooves in its inner wall.

5. A hot top feeder for ingot molds comprising a body portion of refractory material having supporting means on its outer periphery and vertically disposed grooves in the inner wall of the feeder opposite the supporting means.

6. A hot top feeder for ingot molds comprising a body portion having a series of vertically disposed supporting ribs adjacent its upper end and the inner walls of the feeder having vertically disposed grooves opposite the supporting ribs and extending the entire length of the feeder.

In testimony whereof we affix our signatures.

BLOOMFIELD H. HOWARD.
ERNEST J. TURNER.